United States Patent
Schiel et al.

[11] Patent Number: 5,808,844
[45] Date of Patent: Sep. 15, 1998

[54] CURRENT DIFFERENTIAL PROTECTION ARRANGEMENT

[75] Inventors: Ludwig Schiel; Steffen Noack, both of Berlin; Norbert Schuster, Forchheim/Kersbach, all of Germany

[73] Assignee: Siemens Aktiengesellschaft, Munich, Germany

[21] Appl. No.: 809,765

[22] PCT Filed: Sep. 26, 1995

[86] PCT No.: PCT/DE95/01372

§ 371 Date: Aug. 11, 1997

§ 102(e) Date: Aug. 11, 1997

[87] PCT Pub. No.: WO96/10857

PCT Pub. Date: Apr. 11, 1996

[30] Foreign Application Priority Data

Sep. 30, 1994 [DE] Germany .................... 44 36 254.4

[51] Int. Cl.[6] ...................................................... H02H 3/16
[52] U.S. Cl. ............................ 361/45; 361/36; 361/44; 361/94; 361/97
[58] Field of Search ........................... 361/36, 42, 44–46, 361/93–95, 96–97

[56] References Cited

U.S. PATENT DOCUMENTS

| | | | |
|---|---|---|---|
| 3,754,163 | 8/1973 | Sykes .................................. | 361/36 |
| 4,204,237 | 5/1980 | Zocholl .............................. | 361/36 |
| 4,772,978 | 9/1988 | Oura et al. ......................... | 361/36 |
| 4,951,170 | 8/1990 | Fromm ............................... | 361/87 |

FOREIGN PATENT DOCUMENTS 0 348 673   1/1990   European Pat. Off. .

OTHER PUBLICATIONS

Siemens, "Digitaler Differentialschutz für Transformatoren Generatoren und Motoren",7UT51, V.2.1,Betsell–Nr. C73000–G1100–C77–7,pp. 19 and 27.

H. J. Hermann; U. Förster, "Einsaltz von Mikrorechnern für den digitalen Transformatordifferentialschutz" MSR, Berlin 28 (1985), H.4,pp. 157–160.

*Primary Examiner*—Jeffrey A. Gaffin
*Assistant Examiner*—Michael J. Sherry
*Attorney, Agent, or Firm*—Kenyon & Kenyon

[57] ABSTRACT

A current differential protection arrangement for an electric power supply unit with a measured value pre-processing device and an analysis device that checks on the basis of a predefined dependence of a differential current on a stabilizing current (response characteristic curve) to determine whether the differential and stabilizing current values thus formed are in a blocking range or a triggering range, where an additional stabilization range is present in the blocking range. To avoid fixed-time blocking after an external fault with transformer saturation with such a protection arrangement, the analysis device in a stabilizing circuit contains a testing arrangement which checks the current values thus formed to determine whether they describe a point in the additional stabilization range. If this is the case, a blocking signal is produced, which activates the blocking device downstream from the testing arrangement. When a first point of the current values is subsequently detected outside the additional stabilization range, a timing element that is connected at the output to a resetting input of the blocking device is set.

5 Claims, 6 Drawing Sheets

CURRENT DIFFERENTIAL PROTECTION ARRANGEMENT

FIELD OF THE INVENTION

The present invention relates to a current differential protection arrangement for an electric power supply unit with a measured value pre-processing device where differential current values are formed continuously from currents detected at the ends of the power supply unit when a fault has occurred, and with an analysis device that checks on the basis of a known dependence of the differential current on the stabilizing current (response characteristic curve) to determine whether the differential and stabilizing current values thus formed describe a point on one side of the response characteristic curve (blocking range) or a point on the other side of the response line (triggering range). The analysis device is designed with regard to the formation of the blocking range so that an additional stabilization range that is provided in the blocking range to achieve an additional stabilization is defined by a section of the blocking range that is below a limit characteristic curve, which begins at a predetermined stabilizing current value and increases linearly with the stabilizing current in a predefined manner.

BACKGROUND INFORMATION

A conventional current differential protection arrangement is Siemens digital differential protection device 7UT51 V2.1, whose design is described in the respective equipment handbook, order no. C 73000-G 1100-C77-7. With this known current differential protection arrangement, as is customary with current differential protection arrangements in general, the currents $I_1$ and $I_2$ (see also FIG. 1) are detected at ends 1 and 2 of an electric power supply unit 3, which may be, for example, a motor, a transformer, or a line section of an electric power supply network. As FIG. 1 also shows, a positive direction of currents $I_1$ and $I_2$ is selected so that the currents flowing into electric power supply unit 3 to be monitored have a positive direction. As is also conventional, in the event of a fault in electric power supply unit 3, differential current values that can be described by the following equation (1) are also formed from the detected currents $I_1$ and $I_2$ with current differential protection arrangement 4:

$$I_{DIFF} = |I_1 + I_2| \quad (1)$$

Furthermore, stabilizing current values $I_{STAB}$ that correlate with the differential current values are generated according to the following equation (2):

$$I_{STAB} = |I_1| + |I_2| \quad (2)$$

The differential current values and the stabilizing current values are formed in a measured value pre-processing device (not shown in detail in FIG. 1). Furthermore, as stated on page 27 of the above-mentioned handbook, the respective vector group is also taken into account in the measured value preprocessing device when the electric power supply unit is a transformer, and the zero currents are also eliminated.

With the conventional current differential protection arrangement, the differential and stabilizing current values are analyzed in an analyzing device downstream from the measured value preprocessing device to the extent that a check is performed on the basis of a given dependence of the differential current on the stabilizing current (response characteristic curve) to determine whether the current values thus formed describe a point on one side of the response characteristic curve, i.e. in the blocking range, or a point on the other side of the response characteristic curve, i.e., in the triggering range. If the current values are in the triggering range, a triggering command is issued by the current differential protection arrangement. When a point described by the differential current value and the respective stabilizing current value is in the blocking range, no triggering command is issued, because this indicates a fault outside the electric power supply device to be monitored.

It is also described on page 19 of the aforementioned equipment handbook that additional stabilization is used with the conventional device which stabilization is to be achieved in the event of saturation of the transformers required for detection of the current, e.g., transformers 5 and 6 shown in FIG. 1, i.e., an internal fault can be simulated by transformer saturation. Therefore, an additional stabilizing range that forms a section of the blocking range is defined by the analysis device in the blocking range. This section is defined as a section of the blocking range below a limit line that begins at a predetermined stabilization value and increases linearly with the stabilizing current in a predetermined manner.

The design of the conventional current differential protection arrangement assures that despite the unavoidable transformer saturation, no triggering command is issued when there is an external fault with regard to the electric power supply unit to be monitored. This is made possible by the fact that the transformers do not transmit the currents properly for a few milliseconds and only thereafter do they enter a saturation state where the current values are distorted. Thus, if an external fault is detected before saturation, blocking is initiated with the conventional differential protection arrangement, preventing a triggering command when there is transformer saturation that would simulate an internal fault.

Furthermore, another conventional current differential protection arrangement for a transformer is described in an article by H. -J. Herrmann and U. Förster, "Einsatz von Mikrorechnern für den digitalen Transofrmatordifferentialschutz" ("Using Microcomputers for Digital Differential Protection of Transformers") in the journal "msr" ("Control and Instrumentation Technology"), vol. 28, no. 4 (1985) pages 157 through 160 in which differential current values and stabilizing current values are formed. These current values are formed by using Δ currents that represent differential quantities between two in-phase instantaneous values of the same parameter at different times. If differential current values and stabilizing current values formed with such Δ values are used for analysis, the smallest internal faults can be differentiated from the greatest external faults on the basis of a buffer zone defined in this way.

SUMMARY OF THE INVENTION

The object of the present invention is thus to improve on the conventional current differential protection arrangement such that when an internal fault follows an external fault with transformer saturation, this internal fault can be detected quickly and reliably and a suitable triggering command can be issued.

To achieve the object according to the present invention, the analysis device with a current differential protection arrangement includes a testing arrangement that tests the resulting differential and stabilizing current values to determine whether these values describe a point in the additional stabilization range. The device delivers a blocking signal after a fault occurs when a first point is detected in the additional stabilization range. A blocking device with a respective reset device is positioned downstream from the testing arrangement. The blocking device is activated by the blocking signal, and a timing element provided in the reset device which is started with a preset time lag when a first point is found outside the additional stabilization range within the course of the fault incident, the output of the timing element being connected to a resetting input of the blocking device so it resets the blocking device after the preset time lag.

An important advantage of the current differential protection arrangement according to the present invention is that even when an internal fault in the electric power supply unit occurs immediately following an external fault, a triggering command is generated correctly by the fact that the differential and stabilizing current values are checked with regard to the points described by them to determine whether these points are in the additional stabilization range. When a point in the additional stabilization range is detected with the differential and stabilizing current values for the first time after a fault occurs, a blocking signal is generated to activate the blocking device. Since the stabilizing and differential current values describe a point in the additional stabilization range only when there is an external fault, this indicates that an external fault has occurred and thus the blocking device can be blocked to maintain the saturation of the current transformer to be expected subsequently without affecting the triggering response of the current differential protection arrangement according to the present invention. If the curve for the stabilizing and differential current values leaves the additional stabilization range after a few milliseconds, then the timing element with a preset time lag assures that the blocking device is blocked while the transformer is saturated and therefore no triggering signal can be delivered. Thus, when there is an internal fault immediately following an external fault with the current differential protection arrangement according to the present invention, blocking is performed not for a preset period of time starting at the moment when an external fault is detected, but instead only for a preset period of time starting from a time that depends on the prevailing conditions.

To be able to detect an internal fault following an external fault quickly and reliably, another embodiment of the current differential protection arrangement according to the present invention is provided with a reset device including a monitoring device that receives at the input the differential and stabilizing current values. The reset device is connected at the output to a timer module with a preset time lag. The monitoring device has at the input a quotient-forming element that forms a quotient from the respective differential and stabilizing current values. Downstream from the quotient-forming element in the monitoring device is a threshold value detecting device that starts the timer module when the quotient is above a threshold, and the timer module is connected at the output to the resetting input of the blocking device.

This embodiment of the current differential protection arrangement according to the present invention has the advantage that the blocking device is unblocked again when the quotient of the respective differential current value and the respective allocated stabilizing current value exceeds a certain limit value and the period of time set by the timer module has elapsed, so here again it is ensured that the saturation phenomena of the current transformers occurring for the first time after an external fault cannot affect the response of the current differential protection arrangement according to the present invention since the latter cannot deliver a triggering signal due to the blocking device being unblocked until after the preset time lag has elapsed.

To obtain a triggering command as soon as possible when an internal fault follows an external fault, it is also advantageous with the current differential protection arrangement according to the present invention when, in another embodiment according to the present invention, the resetting device contains a monitoring arrangement that receives the differential and stabilizing current values and contains at the input a quotient-forming element to form the quotient of the differential and stabilizing current values. Downstream from the quotient-forming element is a difference-forming element that forms the difference between successive quotients of the differential and stabilizing current values; downstream from the difference-forming element there is a threshold-detecting device where each difference formed is tested for whether it exceeds an upper threshold value, whereupon a first control signal is generated, and if it falls below a lower threshold, a second control signal is generated. The monitoring arrangement is connected to the blocking device via a counting register for the first control signal that delivers a resetting signal for the blocking device on reaching a preset counter status.

This embodiment has an advantage that when internal faults with relatively low currents follow an external fault with transformer saturation, it is likewise possible to quickly and reliably detect the internal fault because the blocking device can be activated even when the counting register has delivered a resetting signal for the blocking device—before the period of time set in the timing element downstream from the testing arrangement has elapsed. Since the counting register receives the first control signal, it can deliver a resetting signal after the transformer saturation has subsided, at the earliest.

With the current differential protection arrangement according to the present invention, the timing element, the timer module and the counting register are preferably connected to the resetting input of the blocking device via a logic element.

To suppress the effects of the phase angle of the currents detected on the production of a triggering command with the current differential protection arrangement according to the present invention, the measured value pre-processing device with the current differential protection arrangement according to the present invention contains a computation unit where measured quantities proportional to the effective value are formed from the currents detected and are used to obtain the differential and stabilizing current values. Quantities proportional to the effective value can be formed, e.g., by filtering or rectification.

DETAILED DESCRIPTION OF THE INVENTION

Figure 1:
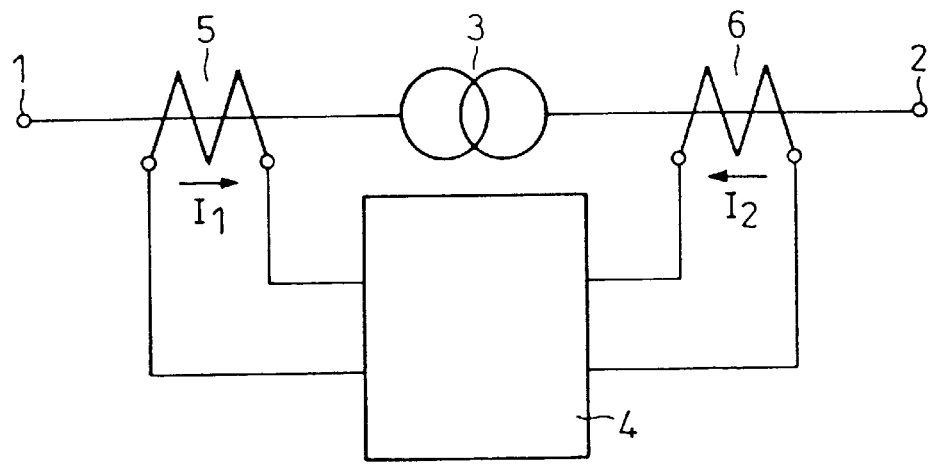
FIG. 1 shows a conventional current differential protection arrangement.
Figure 2:
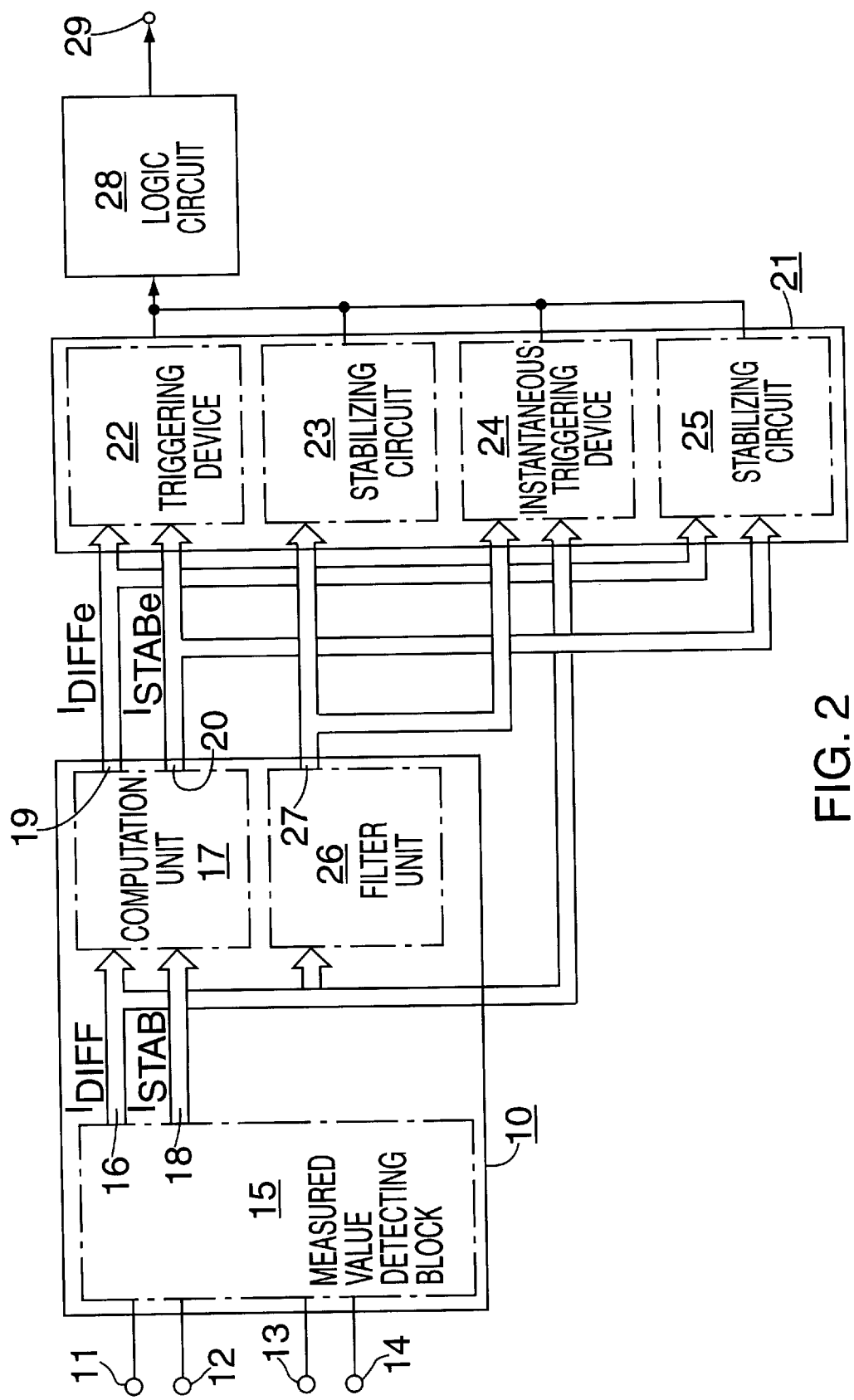
FIG. 2 shows a block schematic of an embodiment of the current differential protection arrangement according to the present invention.

The block schematic of the current differential protection arrangement according to the present invention as illustrated in FIG. 2, which contains a measured value pre-processing device 10 that receives detected current $I_1$ at its inputs 11 and 12 (see also FIG. 1) and receives current $I_2$ at inputs 13 and 14. Measured value pre-processing device 10 is provided at the input with a measured value detecting block 15 where differential currents and stabilizing currents are formed in a known way. In the case when a transformer is the electric power supply unit to be monitored, a vector group adjustment is also performed in measured value processing block 15. Furthermore, absolute value adjustment is also performed in the measured value processing block 15. The measured value is digitally pre-processed in measured value processing block 15 after analog-digital conversion, so differential current values $I_{DIFF}$ corresponding to the respective differential current are supplied to a computation unit 17 via a data bus 16. Over another data bus 18 this computation unit 17 receives from measured value processing block 15 stabilizing current values $I_{STAB}$ proportional to the stabilizing current in digital form.

By filtering or rectification, quantities $I_{DIFFe}$ and $I_{STABe}$ that are proportional to the effective values are formed in computation unit 17 from the differential and stabilizing current values $I_{DIFF}$ and $I_{STAB}$ and each is sent to an analysis device 21 via another data bus 19 and 20. Analysis device 21 contains a triggering device 22, a stabilizing circuit 23 for harmonics, an instantaneous triggering device 24 and another stabilizing circuit 25.

Furthermore, measured value pre-processing device 10 also contains a filter unit 26, whose input is likewise connected to data bus 16 and which filters out the fundamental component as well as the second and fifth harmonics. At the output, filter unit 26 is connected via an additional data bus 27 to stabilizing circuit 23 and instantaneous triggering device 24. At the input, instantaneous triggering device 24 is also connected to data bus 16.

The output signals of individual units 22 through 25 of analysis device 21 are connected to logic circuit 28 which, when it receives the proper signal, delivers a triggering command to power switches (not shown) provided for the electric power supply unit to be monitored.

Figure 3:
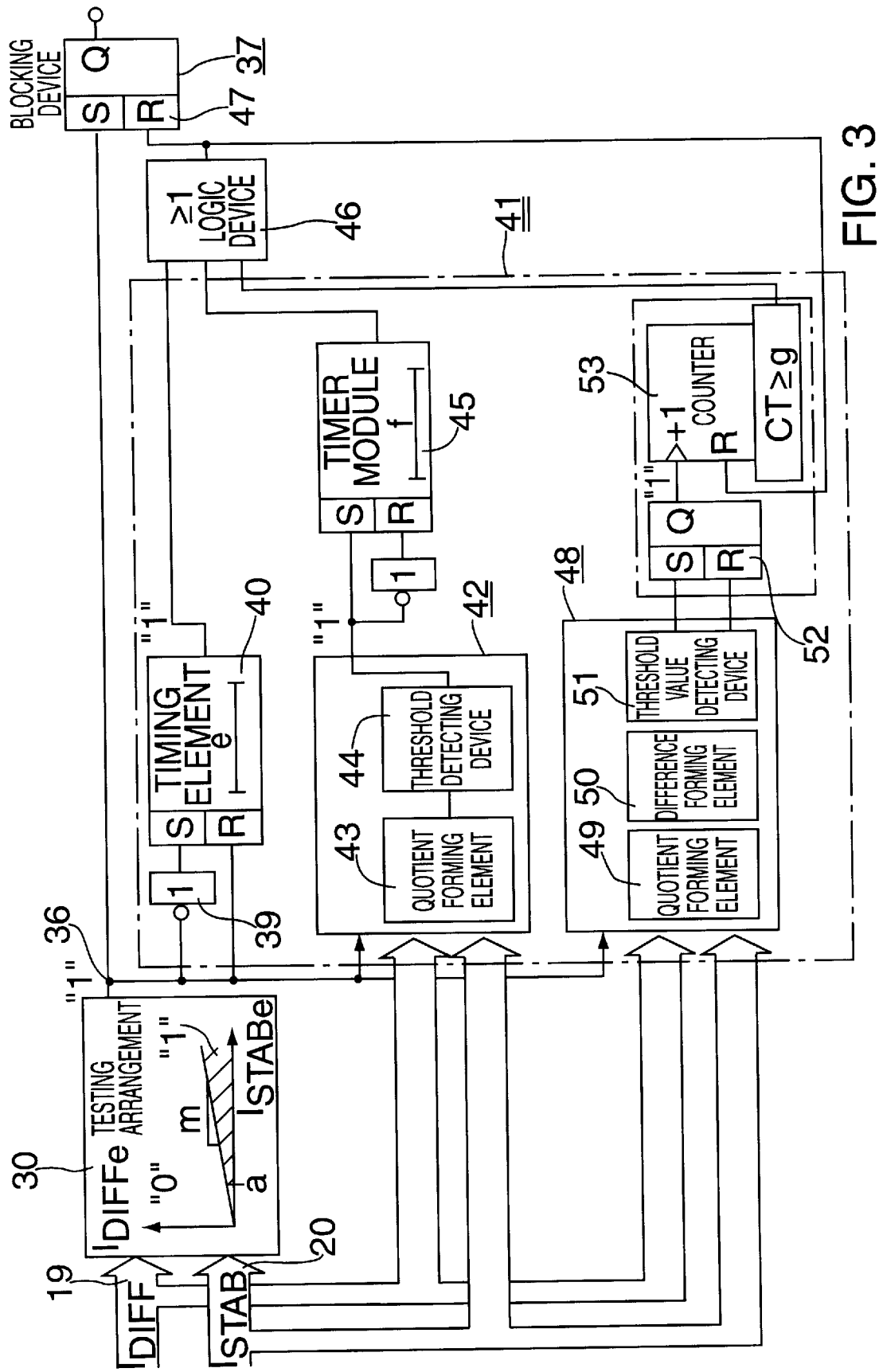
FIG. 3 shows part of an analysis device illustrated in FIG. 2 with a testing arrangement and a resetting device.

FIG. 3 shows details of the additional stabilizing circuit 25 of analysis device 21 according to FIG. 2. As FIG. 3 shows in detail, the additional stabilizing circuit 25 has a test arrangement 30 that is connected at the input to data buses 19 and 20 (see also FIG. 2) and consequently receives differential current values $I_{DIFFe}$ and stabilizing current values $I_{STABe}$ over these data buses. Paired differential current values and stabilizing current values are then tested in testing arrangement 30 to determine whether they define points located in an additional stabilization range 31 (see FIG. 4).

Figure 4:
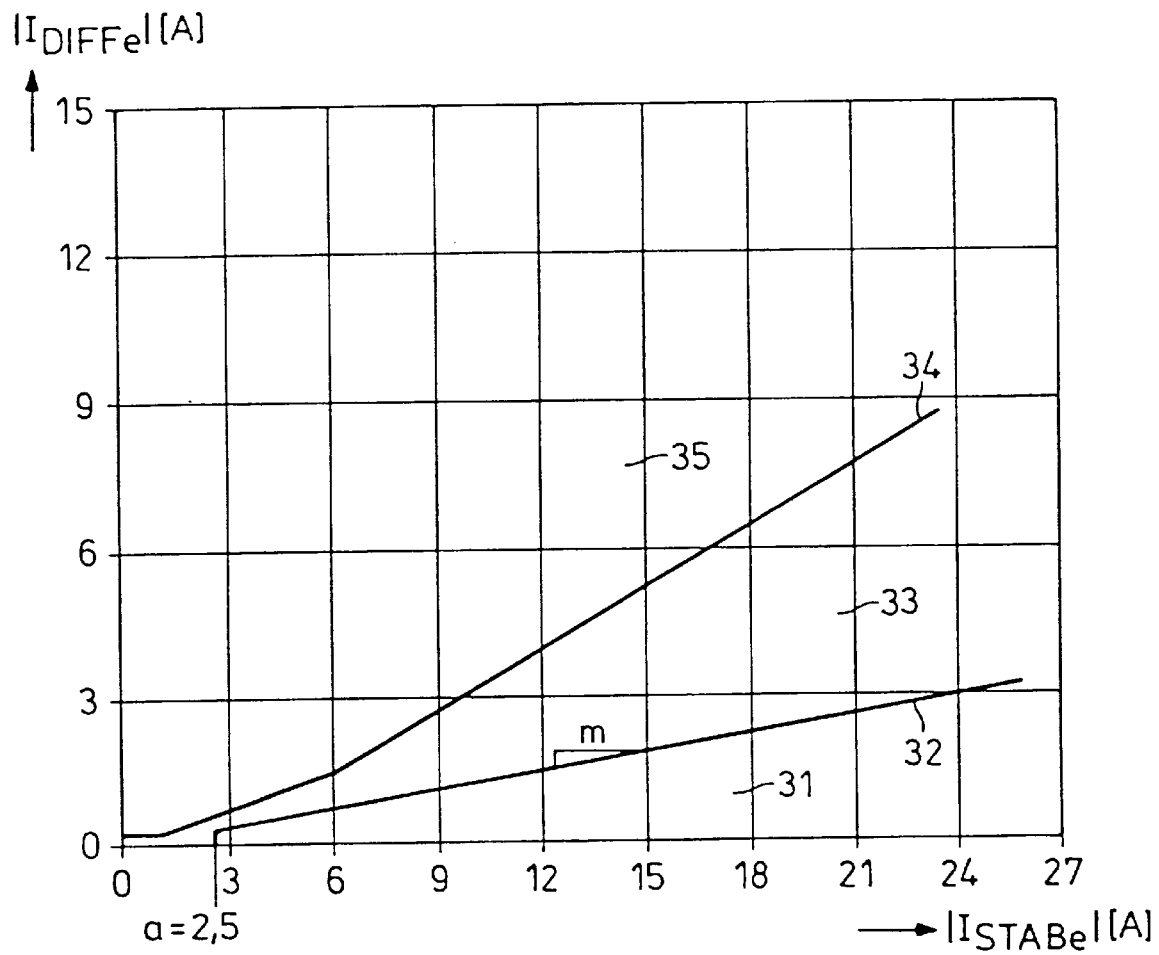
FIG. 4 shows a graph with a response characteristic curve and a limit line of the additional stabilization range.

In FIG. 4, the absolute value of the differential current $I_{DIFFe}$ is plotted as a function of the absoute value of the stabilizing current $I_{STABe}$. FIG. 4 also shows that the additional stabilization range 31 is defined by a limit line 32 that initially runs vertically upward when the value of the stabilizing current $I_{STAB}$ is a=2.5, and then it increases linearly with the stabilizing current $I_{STAB}$ at a predetermined slope m. The additional stabilization range 31 shown in FIG. 4 forms part of a blocking range 33 delimited by a response characteristic curve 34 with respect to a triggering range 35. FIG. 4 thus shows that with paired current differential and stabilizing current values with points in blocking range 33, no triggering command is issued, but a triggering command is issued when paired differential and stabilizing current values describe a point in triggering range 35.

Figure 5:
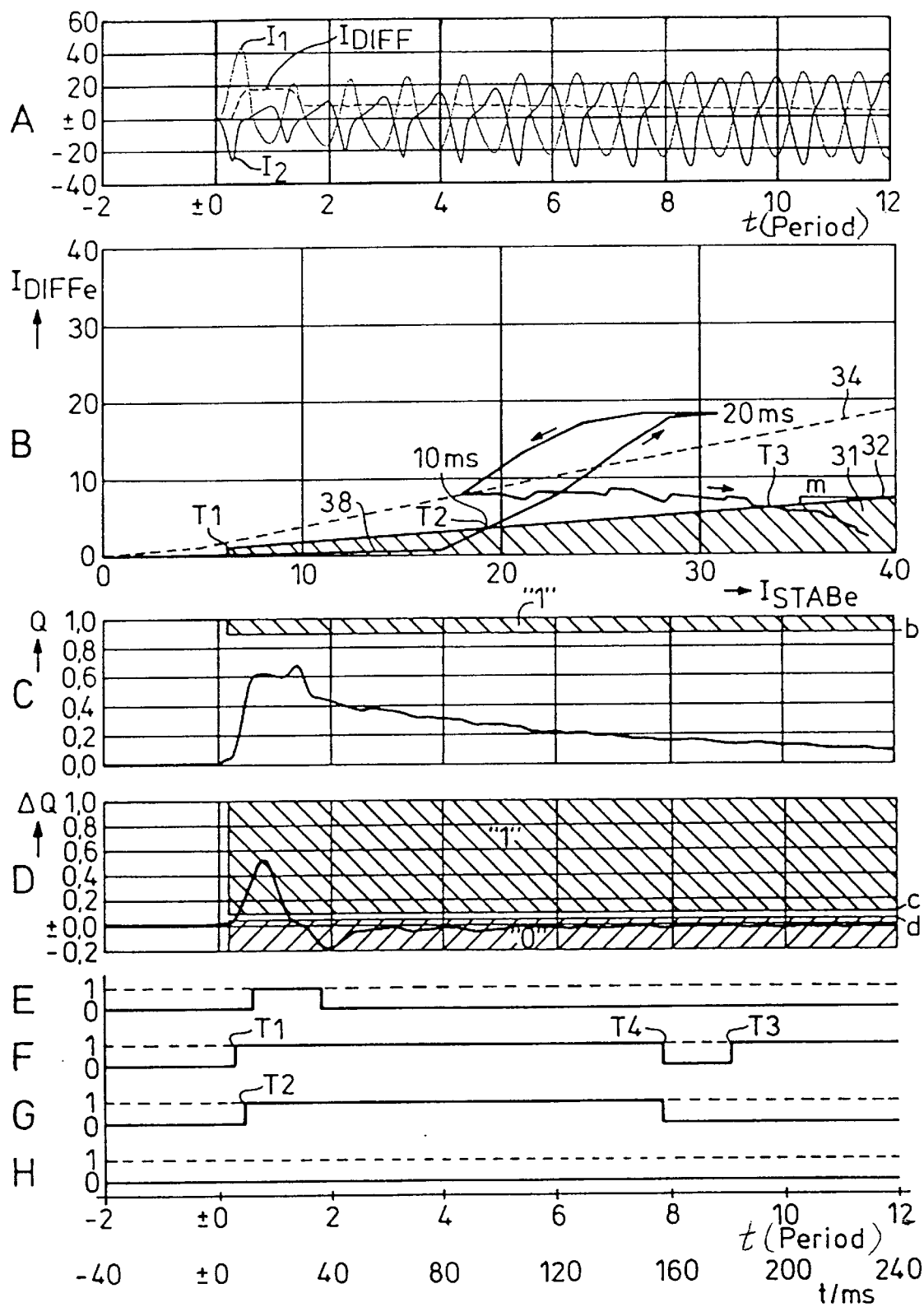
FIG. 5 shows several diagrams to illustrate the response of the current differential protection arrangement according to the present invention when there is an external fault.

To return to FIG. 3, and taking into account the discussion regarding FIG. 4, it is found that testing arrangement 30 tests to determine whether the respective paired differential and stabilizing current values $I_{DIFFe}$ and $I_{STABe}$ that fall in the additional stabilization range 31 are obtained after a fault occurs; specifically, a check determines when a first point formed by the current values falls in the additional stabilization range 31. For example, if there has been an external fault, to which FIG. 5 refers, then as shown by diagram B in FIG. 5, which shows the differential current $I_{DIFF}$ as a function of the stabilizing current $I_{STAB}$, such a point is detected at time T1 after a few milliseconds. Then a blocking signal in the form of a "1" signal is generated by testing arrangement 30 at its output 36, thus activating a downstream blocking device 37. The output of a triggering command is thus blocked. Diagram F in FIG. 5 shows that blocking device 37 is blocked as of time T1. If testing arrangement 30 subsequently finds that curve 38, which is defined by successive current value points in Diagram B of FIG. 5, moves out of the additional stabilization range 31, then a "0" signal is produced at this time T2, which starts a downstream timer module 40 in a resetting device 41 for a predetermined period of time e via an inverter 39 (see FIG. 3).

As diagram B of FIG. 5 also shows, curve 38 intersects response characteristic curve 34 after about 10 ms, whereupon triggering device 22 of analysis device 21 delivers a signal at its output (see FIG. 2). However, this signal must not lead to a triggering command because in the present case an external fault has been assumed with regard to the electric power supply unit to be monitored, so the fact that response characteristic curve 34 has been exceeded can be attributed only to saturation phenomena of the current transformers involved. The output signal of triggering device 22 is shown in diagram E in FIG. 5.

With subsiding saturation of the current transformers involved, curve 38 also subsequently assumes lower values again and then finally crosses limit line 32 of the additional stabilization range 31 at time T3. Thus, at time T3 (see diagram F in FIG. 5) blocking device 37 is again blocked; blocking device 37 had been deactivated again at time T4 after the time set in timer module 40 had elapsed.

In addition to the discussion of FIG. 5 given above in conjunction with the description of FIG. 3, it should also be pointed out with regard to FIG. 5 that diagram A here shows the curves for the currents $I_1$ and $I_2$ detected at the ends of the electric power supply unit to be monitored as a function of the time in line current periods, where the curve shown with a dotted line in this diagram represents the differential current $I_{DIFF}$. It can be seen clearly that the differential current assumes relatively large values within the first two periods, which can be attributed mainly to transformer saturation in the assumed case of an external fault.

Diagram H in FIG. 5 shows the curve of the triggering command as a function of the time in periods, which thus shows that a triggering command has not been generated with the assumed external fault despite transformer saturation.

Resetting device 41 shown in FIG. 3 is not only connected to testing arrangement 30 with respect to timing element 40 but is also connected at buses 19 and 20 to a monitoring device 42 which thus also receives differential current values $I_{DIFFe}$ and stabilizing current values $I_{STABe}$. Monitoring device 42 is provided at the input with a quotient-forming element 43 where the quotient Q is formed from the respective differential current value $I_{DIFFe}$ and the respective correlated stabilizing current value $I_{STABe}$. Downstream from quotient-forming element 43 is a threshold-detecting device 44 that delivers a "1" when the value of the quotient Q exceeds a threshold value b, which then sets a downstream timer module 45. At the output, timer module 45 is connected to a resetting input 47 of blocking device 37 via an OR element 46; moreover, the output of timing element 40 is connected to resetting input 47 of blocking device 37 via OR element 46. If a quotient Q that is smaller than threshold value b is detected by threshold detecting device 44, a "0" signal is generated that resets timer module 45 via an upstream inverter.

To further illustrate the function of monitoring device 42 according to FIG. 3, reference is made again to FIG. 5, specifically diagram C, where the quotient Q of differential current $I_{DIFFe}$ and the respective stabilizing current $I_{STABe}$ has been plotted as a function of the time in periods and threshold value b has been shown for the assumed case of an external fault. Diagram C also shows that in this case, quotient Q does not exceed the threshold value b, so monitoring device 42 delivers a "0" signal; consequently, timer module 45 is not started. Thus, blocking device 37 is not affected by monitoring device 42 in this case.

FIG. 3 also shows that resetting device 41 is provided with a monitoring arrangement 48, which likewise receives differential current values $I_{DIFFe}$ and stabilizing current values $I_{STABe}$ at the input via data buses 19 and 20. Monitoring arrangement 48 is in turn provided with a quotient-forming element 49 at the input with a downstream difference-forming element 50. The difference between successively generated quotients Q is formed in this difference-forming element 50, and a check is performed in a downstream threshold value-detecting device 51 to determine whether the difference of the quotients is greater than a threshold value c or smaller than another threshold value d. If the resulting difference in quotients Q has a threshold value greater than c, a counting register 53 is incremented via a flip-flop 52; if the difference of the quotients Q is found to be smaller than threshold value d, flip-flop 52 is reset again, so counter 53 is not advanced. The counter may be set differently with regard to a counter limit status g; in the case of a limit status g, a signal is delivered by the counting register to OR element 46, whereupon blocking device 37 is reset. Counting register 53 is reset by OR element 46.

To further explain how monitoring arrangement 48 shown in FIG. 3 works, diagram D in FIG. 5 shows the difference ΔQ of successive quotients Q as a function of time in periods. With the assumed external fault, the curve first exceeds limit value c, whereupon flip-flop 52 is set and counting register 53 is incremented by one. Later, curve ΔQ in diagram D drops below the lower threshold value d, whereupon flip-flop 52 is reset; thus, counting is not continued in counting register 53. Once the counting register has been set to a counter limit status "2" it does not deliver a signal to OR element 46 at its output and blocking device 37 is not reset; thus, it remains activated.

Figure 6:
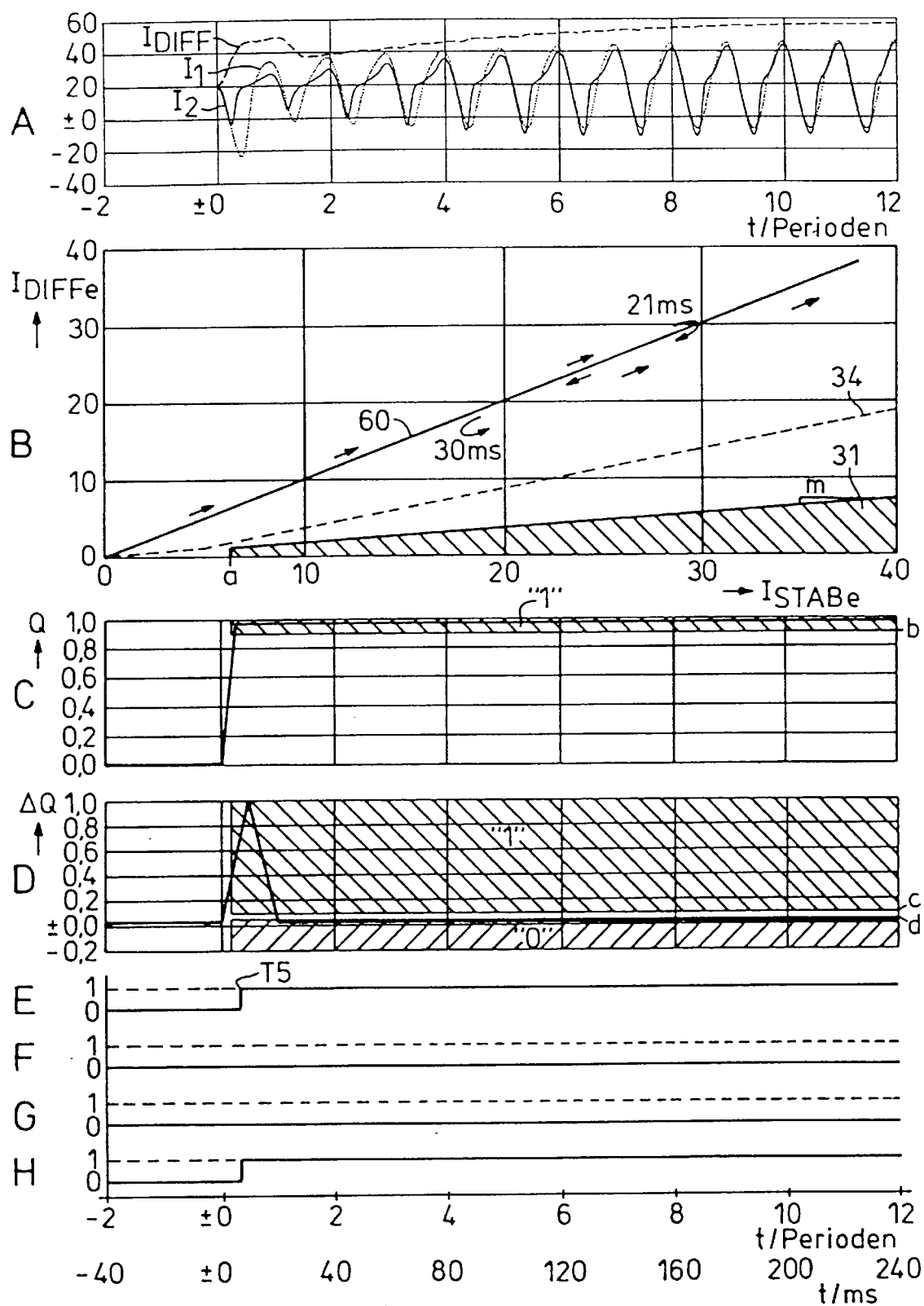
FIG. 6 shows several diagrams to illustrate the operation of the current differential protection arrangement according to the present invention when there is an internal fault.

FIG. 6 shows diagrams A to H similar to those in FIG. 5, but in the present case the curves of the parameters described in detail above are shown for the case of an internal fault with saturation. The curves of currents $I_1$ and $I_2$ are again shown as a function of time in periods in diagram A, where the dotted line again represents the differential current $I_{DIFF}$.

Diagram B in FIG. 6 shows that with the assumed internal fault, curve 60 formed by the successive individual points of differential and stabilizing current values $I_{DIFF}$ and $I_{STAB}$, unlike curve 38 in diagram B in FIG. 5, does not intersect the additional stability range 31, but instead runs far above response characteristic curve 34. In this case, triggering circuit 22 (see FIG. 2) responds at time T5 after occurrence of a fault due to the response time. There is no blocking of blocking device 37 (see FIG. 3), as shown clearly by diagram F in FIG. 6. Thus, a triggering command is issued at time T5 without any further delay via logic circuit 28 shown in FIG. 2. Resetting device 41 has no effect on the triggering response of the differential protection arrangement, because testing arrangement 30 does not activate its output 36 at any time.

Figure 7:
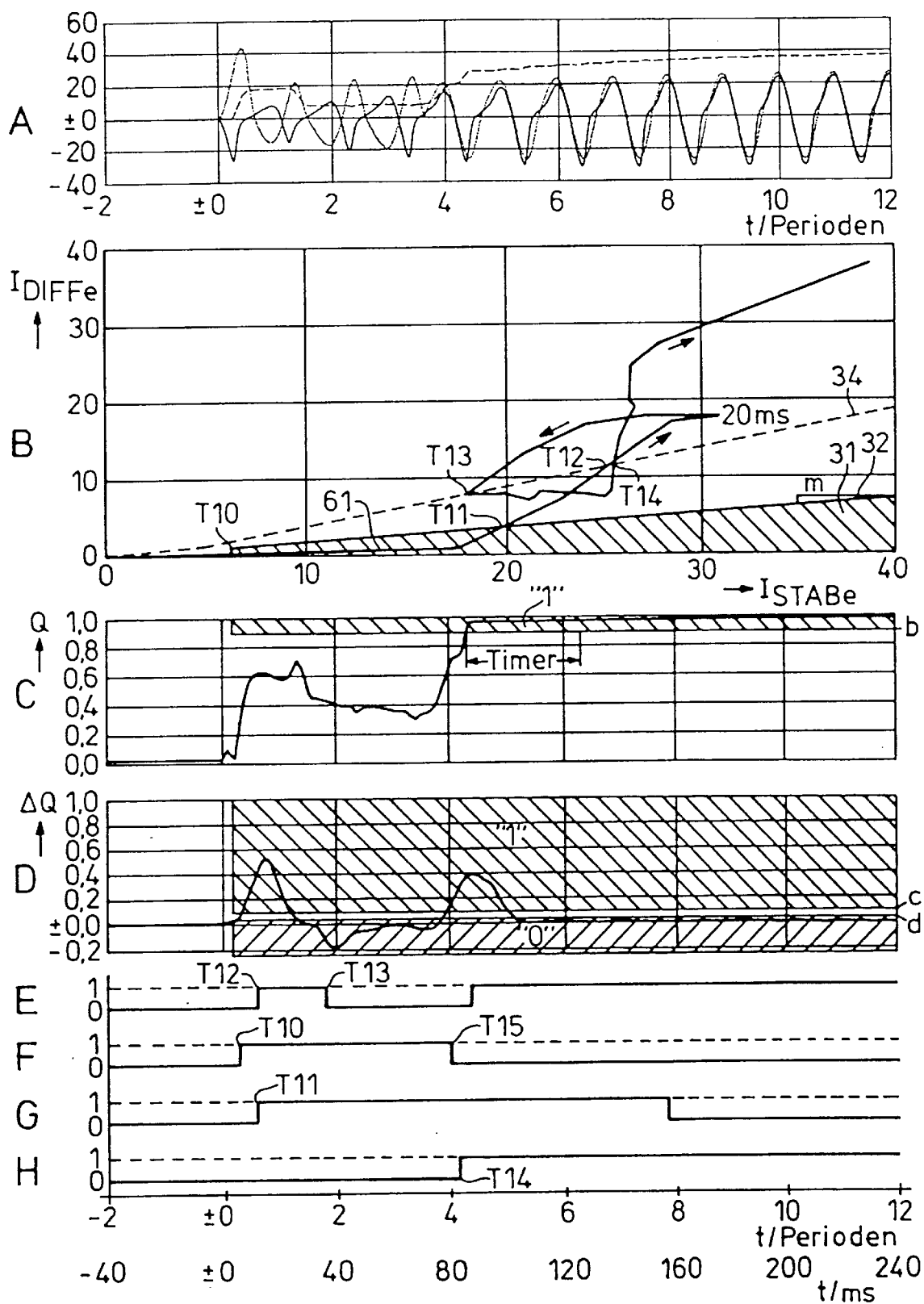
FIG. 7 shows several diagrams to illustrate the response of the current differential protection arrangement according to the present invention when an internal fault follows an external fault.

FIG. 7 shows the relationships that result when an internal fault follows an external fault. Diagram A in FIG. 7 shows the curves for currents $I_1$ and $I_2$ as a function of time in periods and the resulting differential current $I_{DIFF}$. Diagram B shows that at time T10, curve 61 formed by the individual points of the differential and stabilizing current values detected in succession enters additional stabilizing current range 31, whereupon blocking device 37 is activated immediately by testing arrangement 30 (see FIG. 3) via its output 36. At time T11, curve 61 intersects limit line 32 of the additional stabilization range 31, whereupon testing arrangement 30 generates at its output 36 a "0" signal which, after being inverted, causes timing element 40 to start for a predefined time lag e. Curve 61 then intersects response characteristic curve 34 at time T12 because of transformer saturation, whereupon a "1" signal is generated by triggering circuit 22 (see FIG. 2) of analysis device 21, as shown by diagram E in FIG. 7. At time T13, curve 61 again intersects response characteristic curve 34 (transformer saturation has subsided), whereupon triggering circuit 22 again drops back to the "0" state. The transformer saturation occurring between times T12 and T13 has no effect on the triggering response of the differential protection arrangement because blocking device 37 was activated in the interval between T12 and T13.

As diagram B in FIG. 7 also shows, an internal fault occurs approximately at time T14, whereupon curve 61 intersects response characteristic curve 34 a third time. According to diagram H in FIG. 7, a triggering signal is then delivered at output 29 of the current differential protection device, because previously the activation of blocking device 37 had been reversed at time T15 due to the fact that with the relationships shown here according to diagrams C and D, the curve according to diagram D had exceeded the upper threshold value c a second time at time T15. This led to deactivation of blocking device 37 via counting register 53 and OR element 46.

If, unlike the situation shown in diagram C in FIG. 7, quotient Q increases more steeply when an internal fault immediately follows an external fault, and if it reaches threshold value b comparatively quickly, then triggering is achieved by deactivating blocking device 37 after time lag f has elapsed.

What is claimed is:

1. A current differential protection arrangement for an electric power supply unit, comprising:

a measured value pre-processing device for continuously forming differential current values and respective stabilizing current values as a function of currents from the electric power supply unit detected in the event of a fault;

an analysis device including a stabilizing circuit, the stabilizing circuit including a testing arrangement for testing the electrical differential current values and the respective stabilizing current values to determine if the differential and stabilizing current values are positioned at one of a first side of a response characteristic curve in a blocking range and at a second side of the response characteristic curve in a triggering range;

wherein the blocking range includes a stabilization range which is below a limit line in the blocking range starting at a predetermined stabilizing current value and linearly increasing in a predetermined manner as a function of the respective stabilizing current values, and wherein the testing arrangement tests to determine whether the electrical differential current values and the respective stabilizing current values are positioned in the stabilization range, the testing arrangement generating a blocking signal when the electrical differential current values and the respective stabilizing current values are detected in the stabilization range;

a blocking device coupled to the testing arrangement and being activated by the blocking signal generated by the testing arrangement; and a resetting device coupled to the testing arrangement and including a timing element activated with a first preset time lag period when the electrical differential current values and the respective stabilizing current values are detected outside the stabilization range, the timing element being coupled to a resetting input of the blocking device and resetting the blocking device after the first preset time lag period.

2. The current differential protection arrangement according to claim 1, wherein the resetting device includes:

a timer device having a second preset time lag period and an output for coupling to the resetting input of the blocking device; and a monitoring device having:
  a monitoring input for receiving the differential and stabilizing current values,
  a monitoring output for coupling to the timer device,
  a quotient-forming element at the monitoring input for forming a quotient as a function of the differential and stabilizing current values, and
  a threshold value-detecting device coupled to the quotient-forming element and activating the timer device when the quotient is above a threshold value.

3. The current differential protection arrangement according to claim 1, wherein the resetting device includes:

a monitoring arrangement receiving the differential and stabilizing current values, the monitoring arrangement including:
  a quotient-forming element at a monitoring input for forming successively formed quotients as function of the differential and stabilizing current values,
  a difference-forming element coupled to the quotient-forming element, the difference-forming element generating a difference between the successively formed quotients, and
  a threshold value-detecting device coupled to the difference-forming element for determining whether the difference is above an upper threshold value to generate a first control signal or below a lower threshold value to generate a second control signal; and a counting register for coupling the monitoring arrangement to the blocking device to generate the first control signal, wherein the counting register provides a resetting signal to the blocking device at a preset counter status event.

4. The current differential protection arrangement according to claim 3, including a logic element for coupling the timing element, the timer module and the counting register to the resetting input of the blocking device.

5. The current differential protection arrangement according to claim 6, wherein the measured value pre-processing device includes a computation unit for forming measured quantities proportional to an effective value as a function of detected current values, the differential and stabilizing current values being provided as a function of the measured quantities.

* * * * *